United States Patent [19]

Corley et al.

[11] Patent Number: 5,442,035
[45] Date of Patent: Aug. 15, 1995

[54] CALCIUM SULFONATE OR CALCIUM HYDROCARBYL SULFATE ACCELERATOR FOR AMINE CURE OF EPOXY RESINS

[75] Inventors: Larry S. Corley; Harold E. De La Mare, both of Houston, Tex.

[73] Assignee: Shell Oil Company, Houston, Tex.

[21] Appl. No.: 128,932

[22] Filed: Sep. 29, 1993

[51] Int. Cl.⁶ .................... C08G 59/68; C08G 65/10
[52] U.S. Cl. ...................................... 528/90; 528/408
[58] Field of Search .................................. 528/90, 408

[56] References Cited

U.S. PATENT DOCUMENTS

| | | | |
|---|---|---|---|
| 3,057,809 | 10/1962 | Newey | 521/178 |
| 4,389,515 | 6/1983 | De La Mare et al. | 525/420.5 |
| 4,397,998 | 8/1983 | De La Mare et al. | 525/420.5 |
| 4,476,263 | 10/1984 | Owens | 523/100 |
| 4,751,251 | 1/1988 | Thornsberry | 521/112 |
| 4,816,502 | 3/1989 | Lopez | 523/414 |
| 5,221,726 | 6/1993 | Dabi et al. | 528/111 |

OTHER PUBLICATIONS

Chemical Abstracts 83:61975, "Emulsified Epoxy Resin Compositions", Hatano et al.

*Primary Examiner*—Frederick Krass

[57] ABSTRACT

Cure of an epoxy resin by an aliphatic amine is accelerated by a calcium sulfonate or calcium hydrocarbyl sulfate salt. The calcium salt is preferably a salt of a detergent-range sulfonic acid or hydrocarbyl sulfuric acid which is soluble in either the amine or the epoxy resin.

10 Claims, No Drawings

CALCIUM SULFONATE OR CALCIUM HYDROCARBYL SULFATE ACCELERATOR FOR AMINE CURE OF EPOXY RESINS

BACKGROUND OF THE INVENTION

The invention relates to the cure of epoxy resins. In one aspect, the invention relates to acceleration of aliphatic amine cure of epoxy resins.

Certain common accelerators for aliphatic amine cure of epoxy resins, such as alcohols, phenols and carboxylic acids, tend to give a relatively low degree of acceleration. Others, such as calcium nitrate tetrahydrate, overcome this problem but must be added as third components, whether or not dissolved in a solvent. Calcium nitrate, when dissolved in an epoxy resin, tends to cause advancement of the resin and to lose activity on storage. If dissolved in the amine curing agent, it tends to give a copious precipitate in the presence of traces of water (from atmospheric moisture or the water of hydration of calcium nitrate tetrahydrate).

It is therefore an object of the invention to provide an epoxy resin/amine system which exhibits accelerated cure. It is a further object of the invention to provide an aliphatic amine-cured epoxy resin system having an amine-soluble accelerator component.

SUMMARY OF THE INVENTION

According to the invention, cure of an epoxy resin by an aliphatic amine is accelerated by a calcium sulfonate or calcium hydrocarbyl sulfate salt. The calcium salt is preferably a salt of a detergent-range sulfonic acid, or a detergent-range hydrocarbyl sulfuric acid, which is soluble in either the amine or the epoxy resin.

DETAILED DESCRIPTION OF THE INVENTION

The epoxy resin component of the invention composition can be any epoxy-functional compound having an average of more than one vicinal epoxide group per molecule. Preferred epoxy resins are diglycidyl ethers of a bisphenol prepared by the reaction of epichlorohydrin with a compound containing two hydroxyl groups, such as bisphenol-A or bisphenol-F, carded out under alkaline reaction conditions. Such an epoxy resin can be represented by the structural formula

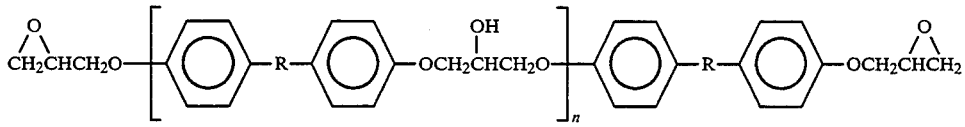

which n is a number within the range of 0 to about 2 and R is a direct bond or a divalent hydrocarbyl group. Suitable epoxy resins have molecular weights within the range of 300 to 3000, preferably about 300 to about 1000. The commercially available EPON ® Resin 828, a reaction product of epichlorohydrin and bisphenol-A having an epoxide equivalent weight (ASTM D-1652) of about 182 and an n value in the formula above of about 0.2, is the preferred epoxy resin for use in the invention compositions.

The aliphatic amine curing agent component of the invention compositions can be any compound having two or more active amine groups. Preferred amines include $C_{5-15}$ aliphatic and cycloaliphatic diamines and polyamines such as 2-methyl-1,5-pentanediamine, 1,2-diaminocyclohexane, triethylenetetramine, diethylenetriamine, 1,4- or 1,3-diaminocyclohexane, isophoronediamine, 1,3-bis(aminomethyl)benzene, 1,3-bis(aminomethyl)cyclohexane, isomeric mixtures of bis(4-aminocyclohexyl)methane, oligo(propylene oxide)diamine and adducts of the above amines with epoxy resins, epichlorohydrin, acrylonitrile, ethylene oxide, and the like.

The amine will be present in the composition in an amount effective to cure the epoxy resin, generally an amount within the range of about 0.6 to about 2 equivalents, based on the epoxy resin.

The calcium sulfonate or calcium hydrocarbyl sulfate accelerator component of the invention composition can be described by the chemical formulae

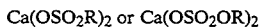

in which R is a $C_{6-25}$ hydrocarbon or hydrocarbon-containing group. R can be, for example, $C_{6-20}$ aliphatic, $C_{12-25}$ alkaryl, or, $CH_3(OCH_2CH_2)_nO$— where n is greater than about 2. Some or all of the hydrogen atoms may alternatively be replaced by halogens. Such calcium sulfonates and calcium hydrocarbyl sulfates include, for example, calcium dodecylbenzene sulfonate, calcium dodecyl sulfate, calcium hexanesulfonate, calcium 3-oxaheptyl sulfate, calcium perfluorooctane sulfonate, calcium 2-hydroxyoctadecane sulfonate, etc. The preferred accelerators, because of their commercial availability and demonstrated effectiveness, are detergent-range ($C_{12-20}$) alkaryl sulfonates such as those commercially available from Stepan Company under the trade name Ninate 401. The accelerator can be conveniently added to the resin or amine component as a solution in an organic solvent.

The calcium sulfonate or calcium hydrocarbyl sulfate is present in the epoxy/amine formulation in an amount effective to accelerate cure of the epoxy by the amine, generally an amount within the range of about 0.1 to about 10 parts per hundred parts by weight of epoxy resin.

The invention compositions can be prepared by blending the epoxy, the amine and the calcium sulfonate or calcium hydrocarbyl sulfate in any order desired. The compositions can be provided as a two-container system, with the calcium sulfonate or calcium hydrocarbyl sulfate present as an additive in the epoxy resin or, preferably, in the amine.

Cure of the invention compositions can be effected by exposure to a temperature of 0° to 100° C. for 1 to 24 hours. Certain of the compositions are curable at room temperature over a time of about 8 to 24 hours.

The invention compositions are useful for coatings, adhesives, flooring, casting and composites fabrication.

EXAMPLE 1

Accelerator Activity of Calcium Sulfonate Compared with Calcium Nitrate.

A mixture (Accelerator A) was prepared by mixing 59 parts by weight of Ca(NO$_3$)$_2$.4H$_2$O with 41 parts by weight of polyethylene glycol 400 and stirring until the mixture became a homogeneous liquid. Accelerator A, Stepan Ninate 401 calcium dodecylbenzenesulfonate solution and salicylic acid (the latter predissolved in 2-methyl-1,5-pentanediamine) were then mixed with EPON® Resin 828 and 2-methyl-1,5-pentanediamine in the indicated proportions and the mixtures (mass 75-80g) were then tested for gel time (with no external heat applied) in a Shyodu gel timer with a rotating probe, and also on thin film gel plates at 90° C. and 120° C. Additional mixtures of the epoxy resin with 2-methyl-1,5-pentanediamine and the accelerators were prepared and poured into casting molds made of two ⅛" (3.18 mm) thick glass plates separated by a ⅛" (3.18 mm) thick polytetrafluoroethylene spacer. The castings were allowed to cure overnight at room temperature and were then cured for 2 hours at 80° C. the following day. Physical properties of the castings were determined and are shown in Table 1.

TABLE 1

|  | 1 | 2 | 3 | 4 | 5 | 6 | 7 |
|---|---|---|---|---|---|---|---|
| Composition: | | | | | | | |
| Epoxy Resin, grams | 128 | 128 | 128 | 128 | 128 | 128 | 128 |
| epoxy equivalents | 0.681 | 0.681 | 0.681 | 0.681 | 0.681 | 0,691 | 0.681 |
| 2-methyl-1,5-pentanediamine, grams | 22 | 22 | 22 | 22 | 22 | 22 | 22 |
| NH equiv. | 0.757 | 0.757 | 0.757 | 0.757 | 0.757 | 0.757 | 0.751 |
| Accelerator A, grams | | 1.28 | 1.92 | | | | |
| Ninate 401, grams | | | | 1.28 | 2.56 | 3.84 | |
| Salicylic acid, grams (predissolved in amine) | | | | | | | 2.56 |
| NH/epoxy ratio, eq/eq | 1.11 | 1.11 | 1.11 | 1.11 | 1.11 | 1.11 | 1.11 |
| Uncured properties: | | | | | | | |
| Shyodu gel time, min. | 88.5 | 10.2 | 7.6 | 33.3 | 12.0 | 10.7 | 22.3 |
| Thin film gel time, sec., 90° C. | 340 | 180 | 280 | 180 | 170 | 200 | |
| 120° C. | 95 | 25 | 72 | 46 | 39 | 53 | |
| Cured properties: | | | | | | | |
| Rheometrics tan δ peak, °C. | 113 | 110 | 117 | 107 | 105 | 105 | 116 |
| R.T. dry flexural (ASTM D-790) | | | | | | | |
| Yield strength, MPa | 102 ± 1 | 104 ± 1 | 106 ± 1 | 105 ± 1 | 105 ± 1 | 105 ± 1 | 116 ± 1 |
| Tangent modulus, GPa | 2.66 ± 0.02 | 2.67 ± 0.03 | 2.73 ± 0.03 | 2.70 ± 0.02 | 2.69 ± 0.03 | 2.67 ± 0.03 | 2.96 ± 0.03 |
| Break elongation, % | ≧6.5 | ≧6.5 | ≧6.5 | ≧6.4 | ≧6.5 | ≧6.4 | ≧6.5 |
| Compact tension fracture toughness, K$_q$, MPa-m$^{\frac{1}{2}}$ (ASTM E 399-83) | 1.94 ± 0.11 | 1.94 ± 0.09 | 1.76 ± 0.14 | 1.88 ± 0.15 | 1.83 ± 0.09 | 1.75 ± 0.04 | 1.51 ± 0.07 |
| 93° C. H$_2$O pickup, %: 1 day | 1.74 | | | | | | |
| 2 weeks | 2.64 | | | | | | |
| Room temp. methyl ethyl ketone pickup, %: | | | | | | | |
| 1 day | 0.33 | 0.25 | 0.23 | 0.29 | 0.29 | 0.20 | 0.36 |
| 2 weeks | 3.16 | 5.01 | 4.48 | 6.32 | 5.49 | disint. | 6.27 |
| Room temp. CH$_2$Cl$_2$ pickup, %, 1 day | disint. | disint. | disint. | disint. | disint. | disint. | disint. |

From Table 1 above can be seen the accelerator effect of the Ninate 401. On a weight basis, Ninate 401 is a weaker accelerator than Accelerator A but slightly stronger than salicylic acid. On the basis of calcium content, however, Ninate 401 (3.73% calcium by weight) is almost as active as the calcium nitrate-based Accelerator A (10% calcium by weight).

EXAMPLE 2

Comparison of Stability of Calcium Sulfonate Accelerator and Calcium Nitrate Accelerator as Solutions in 2-Methyl-1,5-Pentanediamine.

Mixtures of Ninate 401 (or Accelerator A), with 2-methyl-1,5-pentanediamine and water were prepared in small vials as shown in Table 2 below.

TABLE 2

| Mixture # | 1 | 2 | 3 | 4 | 5 | 6 | 7 | 8 |
|---|---|---|---|---|---|---|---|---|
| 2-methyl-1,5-pentanediamine, grams | 5.5 | 5.5 | 5.5 | 5.5 | 5.5 | 5.5 | 5.5 | 5.5 |
| Accelerator A, grams | 0.96 | 0.96 | 0.96 | 0.96 | | | | |
| Ninate 401, grams | | | | | 0.96 | 0.96 | 0.96 | 0.96 |
| Water, grams | | 0.11 | 0.30 | 1.00 | | 0.11 | 0.30 | 1.00 |
| Precipitate after 1 day? | Yes | Yes | Yes | Yes | No | No | No | No |
| Precipitate after 2 months? | Yes | Yes | Yes | Yes | No | No | No | Yes |

From Table 2 can be seen that the mixtures containing Ninate 401 showed much greater resistance to precipitate formation, even in the presence of water. All of the mixtures containing Accelerator A showed heavy precipitate formation after 1 day, whereas all the Ninate 401 mixtures (except the one with the highest amount of added water) were free of precipitate even after 2 months. Table 3 below shows that Ninate 401/2-methyl-1,5pentanediamine mixtures showed no loss of accelerator activity after storage for six days, when the amine mixtures were mixed with EPON Resin 828 and gel tests were run as in Example 1.

TABLE 3

| Mixture # | 1 | 2 |
|---|---|---|
| 2-methyl-1,5-pentanediamine, grams | 55 | 55 |
| Ninate 401, grams | 3.2 | 9.6 |
| Amount of above amine mixture used for gel tests, g | 11.64 | 12.92 |
| Amount of EPON ® Resin 828 used for gel tests, g | 64 | 64 |
| Shyodu gel time, min., initially | 33.3 | 10.7 |
| after 6 days | 25.9 | 9.4 |
| Thin film gel time, sec., initially, 90° C. | 280 | 170 |
| 120° C. | 72 | 39 |
| Thin film gel time, sec., after 6 days, 90° C. | 290 | 175 |
| 120° C. | 70 | 25 |

EXAMPLE 3

Comparison of Calcium Naphthenate with Accelerator A and Ninate 401 as an Accelerator for Aliphatic Amine Cure of Epoxies.

A calcium naphthenate mixture (Nuodex) containing 10% calcium was tested as an alternative accelerator to Accelerator A and Ninate 401 for the cure of EPON Resin 828 with 2-methyl-1,5-pentanediamine, as shown in Table 4 below. One can see from the results shown below that calcium naphthenate had little or no accelerator activity, even though it was soluble in the resin/amine mixture. This suggests that calcium salts of anions with relatively high basicity and nucleophilicity, such as most carboxylate anions, may not be generally effective as accelerators.

TABLE 4

| Mixture # | 1 | 2 | 3 |
| --- | --- | --- | --- |
| EPON ® Resin 828, grams | 64 | 64 | 64 |
| 2-methyl-1,5-pentanediamine, grams | 11 | 11 | 11 |
| Calcium naphthenate, grams |  | 0.64 | 1.28 |
| Shyodu gel time, min. | 88.5 | 80.5 | 92.9 |

EXAMPLE 4

Acceleration of Amine Cure of Epoxy Resin using Ninate 401 anti Other Accelerators.

Mixtures of EPON Resin 828 with Amicure PACM (mixture of isomers of bis(4-aminocyclohexyl)methane) and accelerators were prepared and Shyodu gel time was determined as in previous examples. Table 5 shows the relative effect of these materials as accelerators.

TABLE 5

| Mixture # | 1 | 2 | 3 | 4 | 5 |
| --- | --- | --- | --- | --- | --- |
| EPON ® Resin 828, grams | 58 | 58 | 58 | 58 | 58 |
| Amicure PACM, grams | 17 | 17 | 17 | 17 | 17 |
| Accelerator A, grams |  | 0.58 |  |  |  |
| Ninate 401, grams |  |  |  | 0.59 | 1.16 |
| Salicylic acid, grams (predissolved in amine) |  |  |  |  | 0.59 |
| Shyodu gel time, min. | 202 | 24.3 | 126.3 | 68.2 | 81.1 |

We claim:
1. A composition comprising:
   (a) an epoxy resin;
   (b) an effective amount of a primary $C_{5-15}$ aliphatic polyamine curing agent for the epoxy resin; and
   (c) a cure-accelerating amount of a calcium sulfonate or calcium hydrocarbyl sulfate represented by one of

$Ca(OSO_2R)_2$ or $Ca(OSO_2OR)_2$ in which each R is independently selected from $C_{6-25}$ hydrocarbyl or hydrocarbyl-containing moieties.
2. The composition of claim 1 in which the calcium sulfonate can be represented by $Ca(OSO_2R)_2$ in which each R is $C_{6-25}$ hydrocarbyl.
3. The composition of claim 1 in which each R is $C_{12-25}$ as alkaryl.
4. The composition of claim 1 in which each R is $CH_3(OCH_2CH_2)_nO-$, in which n is a number greater than 2.
5. The composition of claim 1 in which the aliphatic polyamine curing agent is a $C_{5-15}$ aliphatic diamine and the calcium sulfonate or calcium hydrocarbyl sulfate is present in an amount within the range of 0.1 to 10 weight percent, based on the weight of the epoxy resin.
6. The composition of claim 1 in which the aliphatic polyamine is selected from the group consisting of 2-methyl-1,5-pentanediamine, 1,2-diaminocyclohexane, triethylenetetramine, diethylenetriamine, and bis(4-aminocyclohexyl)methane.
7. The composition of claim 1 in which the aliphatic polyamine is 2-methyl-1,5pentanediamine.
8. The composition of claim 1 in which the aliphatic polyamine is bis(4aminocyclohexyl)methane.
9. A process for accelerating cure of a composition comprising an epoxy resin and $C_{5-15}$ primary aliphatic polyamine curing agent, the process comprising adding to said composition a cure accelerating amount of a calcium sulfonate or calcium hydrocarbyl sulfate according to one of $Ca(OSO_2R)_2$ or $Ca(OSO_2OR)_2$ in which each R is independently selected from $C_{6-25}$ hydrocarbyl or hydrocarbyl-containing moieties.
10. The process of claim 9 in which the calcium sulfonate or calcium hydrocarbyl sulfate is added in an amount within the range of about 0.1 to about 10 weight percent, based on the weight of the epoxy resin.

* * * * *